(12) United States Patent
Funato

(10) Patent No.: US 7,398,156 B2
(45) Date of Patent: Jul. 8, 2008

(54) POINT SEARCH APPARATUS AND IN-VEHICLE NAVIGATION APPARATUS

(75) Inventor: Yuji Funato, Yokohama (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 11/511,852

(22) Filed: Aug. 29, 2006

(65) Prior Publication Data

US 2007/0073478 A1    Mar. 29, 2007

(30) Foreign Application Priority Data

Sep. 27, 2005    (JP)    ............................. 2005-279948

(51) Int. Cl.
  G01C 21/30    (2006.01)
  G01C 21/00    (2006.01)
  G08G 1/123    (2006.01)

(52) U.S. Cl. .................... 701/208; 701/200; 701/201; 701/207; 701/211; 340/988; 340/990; 340/995.1; 340/995.14; 340/995.17; 340/995.23

(58) Field of Classification Search ................. 73/1.78; 116/32, 33, 35 R; 244/75.1, 76 R, 175, 189, 244/190; 318/581, 591; 340/853.1, 854.1, 340/855.1, 901, 902, 904, 905, 937, 988, 340/990, 991, 995.1, 995.24, 995.28, 425.5, 340/429, 426.12, 426.16, 426.18, 426.19, 340/436, 438, 471, 669, 467; 342/25 B, 342/61, 664, 64, 66, 175, 191, 356, 357.06, 342/357.12, 357.13, 357.14, 457, 458; 701/9, 701/25, 28, 32, 65, 79, 200, 204, 207, 208, 701/213, 201, 202, 209, 211, 212

See application file for complete search history.

(56) References Cited

U.S. PATENT DOCUMENTS

| | | | |
|---|---|---|---|
| 6,414,679 B1 * | 7/2002 | Miodonski et al. | .......... 345/420 |
| 6,873,906 B2 | 3/2005 | Lueer et al. | |
| 2003/0151592 A1 * | 8/2003 | Ritter | ............................ 345/156 |
| 2006/0284879 A1 * | 12/2006 | Nagata et al. | ................ 345/582 |
| 2007/0073477 A1 * | 3/2007 | Krumm et al. | ............... 701/209 |
| 2007/0136259 A1 * | 6/2007 | Dorfman et al. | ................ 707/3 |

* cited by examiner

Primary Examiner—Khoi H. Tran
Assistant Examiner—Bhavesh Amin
(74) Attorney, Agent, or Firm—Brinks Hofer Gilson & Lione

(57) ABSTRACT

There are provided a point search apparatus and an in-vehicle navigation apparatus capable of searching destination candidates from which a user can view a visual target that he/she desires. A search means is formed so as to search destination candidates from which the user can see a visual target specified by visual target specifying means based on information regarding the three-dimensional position of the visual target and information regarding the three-dimensional position of a point that fulfills a search condition determined by a search condition determining means, and which exists around the visual target.

36 Claims, 2 Drawing Sheets

POINT SEARCH APPARATUS AND IN-VEHICLE NAVIGATION APPARATUS

BACKGROUND OF THE INVENTION

1. Field of the Invention

The present invention relates to a point search apparatus and an in-vehicle navigation apparatus, particularly to a point search apparatus and an in-vehicle navigation apparatus for searching destination candidates.

2. Description of the Related Art

Conventionally, in-vehicle navigation apparatuses have performed a search of destination candidates when the user sets a destination of navigation and provided the candidates to the user. In searching the destination candidates, a candidate is identified based on various search conditions such as types and addresses from many objects that exist in map information. Then, a destination of navigation is set by a user selecting a desired destination candidate from the destination candidates provided as the result of searching destination candidates.

Further, in-vehicle navigation apparatuses conventionally have been provided with a periphery search function for searching facilities that exist within a predetermined distance from a predetermined search starting point by using map information. For example, refer to Japanese Patent Laid-Open No. 2004-177232 publication.

However, it was impossible for the conventional in-vehicle navigation apparatuses to search destination candidates from which the user could surely see a particular visual target that the user desires, such as a restaurant with a view of a port, for example.

Even in the case where the above-described periphery search function is used and a periphery search for destination candidates (a restaurant, for example) is performed by using a particular visual target (a port, for example) as the search starting point, it was impossible to surely see the visual target from a searched destination candidate if an obstacle (a high building, for example) existed between the destination candidate and the visual target.

SUMMARY OF THE INVENTION

Consequently, it is an object of the invention to provide a point search apparatus and an in-vehicle navigation apparatus which are capable of searching destination candidates from which the user can surely see a particular visual target that the user desires, and improving user convenience.

To achieve the above-described object, the point search apparatus and the in-vehicle navigation apparatus according to the present invention are characterized in that they are provided with visual target specifying means for specifying a visual target that a user desires to see and search condition determining means for determining a search condition regarding destination candidates from which the user can see the visual target, in which the search means is formed so as to search destination candidates from which the user can see the visual target specified by the visual target specifying means at least based on information regarding the three-dimensional position of the visual target specified by the visual target specifying means, information regarding the three-dimensional position of a point that fulfills the search condition determined by the search condition determining means, which exists around the visual target, and information regarding the height of an object that exists between the visual target and the point. Then, according to the point search apparatus and the in-vehicle navigation apparatus constructed as described, the search of destination candidates (hereinafter, referred to as appropriate destination candidates), from which the user can see the visual target is made possible by the search means.

Further, the point search apparatus and the in-vehicle navigation apparatus according to the present invention are characterized in that the search condition determined by the search condition determining means includes a search condition regarding the type of the destination candidates. Then, according to the point search apparatus and the in-vehicle navigation apparatus constructed as described, a search of an appropriate destination candidate fulfilling the search condition regarding the type of the destination candidates determined by the search condition determining means is made possible by the search means.

Further, the point search apparatus and the in-vehicle navigation apparatus according to the present invention are characterized in that the search condition determined by the search condition determining means includes a search condition regarding a distance between the visual target and the destination candidate. Then, according to the point search apparatus and the in-vehicle navigation apparatus constructed as described, a search of an appropriate destination candidate fulfilling the search condition regarding the distance between the visual target and the destination candidate determined by the search condition determining means is made possible by the search means.

Furthermore, the point search apparatus and the in-vehicle navigation apparatus according to the present invention are characterized in that the search condition determined by the search condition determining means includes a search condition regarding a sight line angle of the user in a height direction when the user sees the visual target. Then, according to the point search apparatus and the in-vehicle navigation apparatus constructed as described, a search of an appropriate destination candidate fulfilling the search condition regarding the sight line angle of the user in the height direction when the user sees said visual target, which is determined by the search condition determining means, is made possible by the search means.

Further, the point search apparatus and the in-vehicle navigation apparatus according to the present invention are characterized in that the search condition determined by the search condition determining means includes a search condition regarding a direction in which the user sees the visual target. Then, according to the point search apparatus and the in-vehicle navigation apparatus constructed as described, a search of an appropriate destination candidate fulfilling the search condition regarding the direction in which the user sees the visual target, which is determined by the search condition determining means, is made possible by the search means.

Further, the point search apparatus and the in-vehicle navigation apparatus according to the present invention are characterized in that the search condition determining means is formed so as to automatically determine a search condition regarding a distance between the visual target and the destination candidate in response to the size of the visual target. Then, according to the point search apparatus and the in-vehicle navigation apparatus constructed as described, a search of an appropriate destination candidate fulfilling the search condition regarding the distance between the visual target and the destination candidate, which is automatically determined by the search condition determining means in response to the size of the visual target, is made possible by the search means.

Moreover, the point search apparatus and the in-vehicle navigation apparatus according to the present invention are characterized in that, in the case where the visual target specified by the visual target specifying means is a type of visual target that is generally to be seen from a distance, the search condition determining means automatically determines a search condition where weather is taken into consideration, and the search means is formed so as to obtain weather information based on the determination and to search destination candidates that exist within the range of distance at which the visual target can be seen by taking the obtained weather information into consideration. Then, according to the point search apparatus and the in-vehicle navigation apparatus constructed as described, a search of an appropriate destination candidate from which the user can surely see the visual target while weather information is taken into consideration is made possible by the search means.

Further, the point search apparatus and the in-vehicle navigation apparatus according to the present invention are characterized in that the visual target specifying means is formed to be capable of specifying a desired range of an object as the visual target. Then, according to the point search apparatus and the in-vehicle navigation apparatus constructed as described, a search of an appropriate destination candidate by the search means is made possible after specifying the desired range of an object as the visual target by the visual target specifying means.

Further, the point search apparatus and the in-vehicle navigation apparatus according to the present invention are characterized in that the visual target specifying means is formed so as to provide the user with a plurality of range options, which are organized into a plurality of steps to allow the area of the range to be different for each step, as options of a range that can be specified as a visual target for the object, and formed so as to specify a range for the object, which is an option selected by the user, as the visual target. Then, according to the point search apparatus and the in-vehicle navigation apparatus constructed as described, providing the user with range options for specifying the visual target from an object is made possible by the visual target specifying means.

Furthermore, the point search apparatus and the in-vehicle navigation apparatus according to the present invention are characterized in that the search means is formed so as to preferentially search destination candidates from which the visual target can be seen to the south. Then, according to the point search apparatus and the in-vehicle navigation apparatus constructed as described, a preferential search of appropriate destination candidates from which the visual target can be seen to the south is made possible by the search means while considering that many buildings are mainly open to the south side.

Further, the point search apparatus and the in-vehicle navigation apparatus according to the present invention are characterized in that a search condition determining means is formed so as to automatically determine a search condition as to whether the visual target is seen from an upper position or a lower position in response to the type of the visual target. Then, according to the point search apparatus and the in-vehicle navigation apparatus constructed as described, automatically determining a search condition as to whether the visual target is seen from an upper position or a lower position in response to the type of the visual target is made possible by the search condition determining means. Based on the determined search condition, the search of appropriate destination candidates where the visual target can be seen from an upper position or a lower position is made possible by the search means.

Further, the point search apparatus and the in-vehicle navigation apparatus according to the present invention are characterized in that information regarding the search condition as to whether the visual target is seen from an upper position or a lower position is previously registered in database in a corresponding relationship with information regarding the type of the visual target, and the search condition determining means is formed to determine the search condition as to whether the visual target is seen from an upper position or a lower position based on the previously registered information regarding the search condition. Then, according to the point search apparatus and the in-vehicle navigation apparatus constructed as described, determining the search condition as to whether the visual target is seen from an upper position or a lower position based on the information regarding the search condition previously registered with the database is made possible by the search condition determining means.

Moreover, the point search apparatus and the in-vehicle navigation apparatus according to the present invention are characterized in that the visual target includes at least one of a facility and a landscape. Then, according to the point search apparatus and the in-vehicle navigation apparatus constructed as described, a search of appropriate destination candidates from which the facility or the landscape can be seen is made possible by the search means.

Further, the point search apparatus and the in-vehicle navigation apparatus according to the present invention are characterized in that, in the case where the visual target is a moving object whose position changes depending on time, the search condition determining means automatically determines that the time when the visual target is to be seen is taken into consideration as the search condition, and the search means is formed so as to search destination candidates for which the time when the visual target is to be seen is taken into consideration based on the determination. Then, according to the point search apparatus and the in-vehicle navigation apparatus constructed as described, a search of appropriate destination candidates from which the moving object can be seen while taking the time when the moving object as the visual target can be seen into consideration is made possible by the search means.

Further, the point search apparatus and the in-vehicle navigation apparatus according to the present invention are characterized in that the moving object is the evening sun. Then, according to the point search apparatus and the in-vehicle navigation apparatus constructed as described, a search of appropriate destination candidates from which the evening sun as the visual target can be seen is made possible by the search means.

Furthermore, the point search apparatus and the in-vehicle navigation apparatus according to the present invention are characterized in that the moving object is a train. Then, according to the point search apparatus and the in-vehicle navigation apparatus constructed as described, a search of appropriate destination candidates from which the train as the visual target can be seen is made possible by the search means.

Further, the point search apparatus and the in-vehicle navigation apparatus according to the present invention are characterized in that they are formed to be capable of providing a departure time in order to allow the user to be at a destination in time to see the visual target. Then, according to the point search apparatus and the in-vehicle navigation apparatus constructed as described, even in the case where the visual target is a moving object that cannot be seen unless the user is at the destination by a predetermined time, it is possible for the user to arrive by the predetermined time without delay by providing a departure time in order to see the moving object.

Further, the point search apparatus and the in-vehicle navigation apparatus according to the present invention are characterized in that they are formed to be capable of displaying an image, which simulates an image seen on the assumption that the visual target is viewed from a destination candidate searched by the search means, on a display section by using map information. Then, according to the point search apparatus and the in-vehicle navigation apparatus constructed as described, in addition to searching appropriate destination candidates, a simulation image where the visual target is seen from appropriate destination candidates can be displayed on the display section.

DESCRIPTION OF THE PREFERRED EMBODIMENTS

In the following, the point search apparatus and the in-vehicle navigation apparatus according to the present invention will be described with reference to FIG. 1 and FIG. 2.

Figure 1:
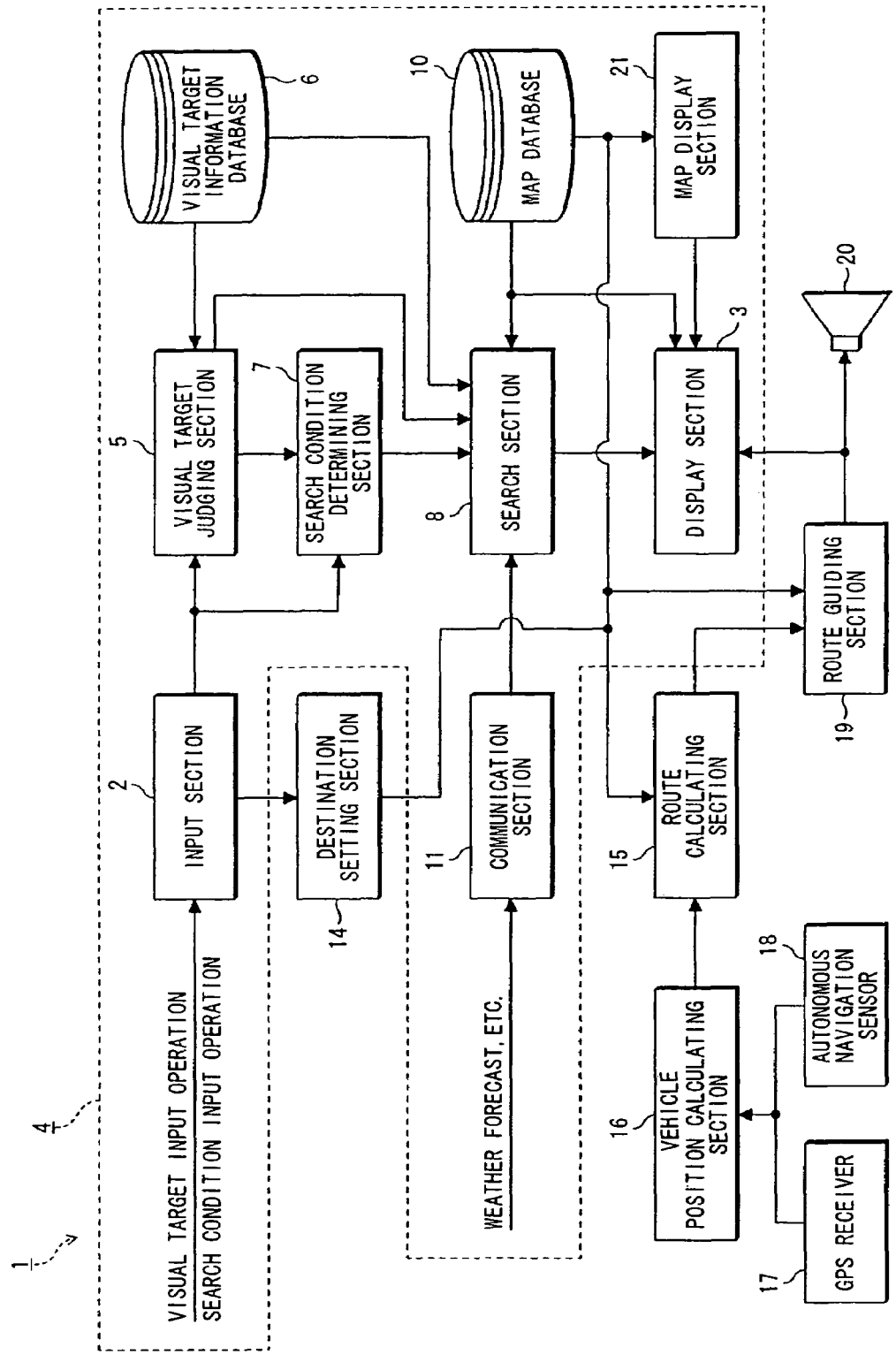
FIG. 1 is a block diagram showing an embodiment of the in-vehicle navigation apparatus according to the present invention.

As shown in FIG. 1, an in-vehicle navigation apparatus 1 in this embodiment is provided with a point search apparatus 4.

The point search apparatus 4 will be described in detail. The point search apparatus 4 has an input section 2 as the visual target specifying means. A user, by performing a visual target input operation in which the user inputs a visual target that he/she wants to see to the input section 2, can specify a visual target. The visual target input operation to the input section 2 may be performed via a remote controller and a linear encoder (both are not shown), or the touch panel of a display section 3 (described later), for example.

Further, the visual target input operation may be performed such that an operation screen, on which an operation of specifying the visual target by its name, address, or a position, a range or the like on a map displayed on the display section 3 can be performed, is displayed on the display section 3, and the input operation is performed via the operation screen displayed on the display section 3.

Furthermore, in performing the visual target input operation, a desired range of an object in a park or the like may be specified as the visual target. As options of the range that can be specified as the visual target of an object such as a park, a plurality of ranges that are organized into a plurality of steps, in which the areas of ranges are different in response to the steps of a partial range of park, a half range of park, a total range of park and the like, may be displayed on the display section 3 in a user selectable state. In this case, the user can easily specify the visual target by selecting an option that he/she likes out of the options displayed on the display section 3.

Further, this embodiment is designed such that the user can perform a search condition input operation in which the user inputs a search condition to the input section 2 regarding destination candidates from which he/she can see the visual target. The search condition input operation to the input section 2 may also be performed via the remote controller, the linear encoder, the touch panel of the display section 3 or the like similar to the visual target input operation. Further, the search condition input operation may be designed such that the operation screen on which the user can perform an operation of inputting a search condition is displayed on the display section 3 and the input operation is performed via the operation screen, similar to the visual target input operation.

As the search condition inputted by the search condition input operation, a condition regarding the types of destination candidates (restaurant, for example), a condition regarding a distance between a visual target and a destination candidate (100 m, for example), a condition regarding the sight line angle of the user in a height direction when he/she sees the visual target (angle of depression: 30 degrees, angle of elevation: 30 degrees, for example), a condition regarding a direction in which the visual target is seen (seeing the visual target to the south, for example) or the like may be provided.

The input section 2 is designed to provide the result of the above-described visual target input operation and search condition input operation to the in-vehicle navigation apparatus 1 (point search apparatus 4).

A visual target judging section 5 that constitutes the visual target specifying means together with the input section 2 is connected to the output side of the input section 2, and the result of the visual target input operation, which is outputted from the input section 2, is inputted to the visual target judging section 5.

A visual target information database 6 is connected to the input side of the visual target judging section 5, and information of various visual targets such as facilities (an amusement park, for example), natural objects (a mountain, for example), landscapes (a park and a port, for example), moving objects (a train and the evening sun, for example) and the like is stored in the visual target information database 6. Meanwhile, it is assumed that the information of each visual target includes information of the name, address, type, elevation, plan position (two-dimensional position), total height, total length, total width, ground area and the like of each visual target, for example.

The visual target judging section 5 is designed to judge the visual target and output a judgment result based on the result of the visual target input operation inputted from the input section 2 and the information of the visual target read out from the visual target information database 6. The visual target is specified by the judgment on the visual target by the visual target judging section 5. In the following, the visual target specified by the judgment of the visual target judging section 5 should be referred to as a specified visual target.

A search condition determining section 7 as the search condition determining means is connected to the output side of the input section 2, and the result of the search condition input operation, which is outputted from the input section 2, is inputted to the search condition determining section 7. The search condition determining section 7 is designed to determine the search condition regarding the destination candidates from which the visual target can be seen based on the result of the search condition input operation which is outputted from the input section 2, and to output the determined search condition. In the case where the result of the search condition input operation, which is inputted from the input section 2, is a "restaurant" that is the condition regarding the type of destination candidates, for example, the search condition determining section 7 determines that restaurants from which the visual target can be seen are searched as the search condition.

A search section 8 as the search means is connected to the output side of the search condition determining section 7 and the output side of the visual target judging section 5, and the search condition outputted from the search condition determining section 7 and the judgment result of the specified visual target, which is outputted from the visual target judging section 5, are provided to the search section 8. Further, the above-described visual target information database 6 and a map database 10 that stores the map information of navigation are connected to the input side of the search section 8. Note that the visual target information database 6 may be a database unified with the map database.

The search section 8, when the judgment result is inputted from the visual target judging section 5 and the search condition is inputted from the search condition determining section 7, is designed to search appropriate destination candidates from which the user can see the specified visual target and that fulfill the search condition (such as the type) determined by the search condition determining section 7. In searching the appropriate destination candidates, the search section 8 is designed to read out the elevation information and the plan position information of the specified visual target from the visual target information database 6 as the information regarding a three-dimensional position of the specified visual target. Further, in searching the appropriate destination candidates, the search section 8 is designed to read out the elevation information and the plan position information of a search target point from the map database 10 as the information regarding a three-dimensional position of a point that exists around the specified visual target, which fulfills the search condition determined by the search condition determining section 7 (hereinafter, referred to as a search target point).

Furthermore, in searching the appropriate destination candidates, the search section 8 is designed to read out the total height information of an object from the map database 10 as the information regarding the height of an object that exists between the specified visual target and the search target point. Note that the information regarding the height of an object that exists between the specified visual target and the search target point may be the elevation information of the highest point of the object.

Then, the search section 8 is designed to search appropriate destination candidates based on the elevation information and the plan position information regarding the specified visual target, which is read out from the visual target information database 6, the elevation information and the plan position information regarding the search target point, which is read out from the map database 10, and the total height information of an object that exists between the specified visual target and the search target point. More specifically, in the case of searching appropriate destination candidates where the specified visual target can be seen from an upper position, if an object having the same height as or higher height than the elevation of a search target point does not exist between the search target point and the specified visual target, for example, the search section 8 is designed to set the search target point as an appropriate destination candidate.

Therefore, according to this embodiment, the search section 8, based on the elevation information and the plan position information regarding the specified visual target, the elevation information and the plan position information regarding the search target point, and the total height information of an object that exists between the specified visual target and the search target point, can search the appropriate destination candidates from which the user can see the specified visual target and that fulfill the search condition determined by the search condition determining section 7 after the search condition input operation by the user.

In addition to the above-described construction, the above-described visual target judging section 5 is further connected to the input side of the search condition determining section 7 in this embodiment, and the visual target judging section 5 is designed to obtain information regarding the size of the specified visual target (information of total height and ground area, for example) from the visual target information database 6 and output the obtained information regarding the size of the specified visual target to the search condition determining section 7.

Then, the search condition determining section 7 is designed to receive the information regarding the size of the specified visual target, which is outputted from the visual target judging section 5, and automatically determine the search condition regarding the distance between the visual target and the destination candidates in response to the size of the specified visual target based on the received information. Specifically, in the case where the size of the specified visual target is large, the search condition determining section 7 automatically determines that appropriate destination candidates, which exist in positions having a longer distance from the specified visual target than a distance in the case of a smaller specified visual target size, are searched as the search condition.

Thus, the search section 8 can search appropriate destination candidates that exist in positions from which the specified visual target can be seen with a preferable size without the need of inputting the search condition regarding the distance between the visual target and the destination candidates through the search condition input operation by the user. Also, the determination of the search condition regarding the distance between the visual target and the destination candidates in response to the size of the specified visual target may be limitedly performed for the case where the search condition regarding the distance between the visual target and the destination candidates is not inputted by the search condition input operation.

In addition to the above-described construction, in this embodiment, the visual target judging section 5 is designed to obtain the information of the type of the specified visual target from the visual target information database 6 and output the obtained information of the type of the specified visual target to the search condition determining section 7. Then, the search condition determining section 7 is designed to receive the information of the type of the specified visual target, which is outputted from the visual target judging section 5, and automatically determine the search condition as to whether the specified visual target should be seen from an upper position or a lower position in response to the type of the specified visual target based on the received information.

For example, in the case where the type of the specified visual target is a type such as a mountain that is preferably seen from a lower position, the search condition determining section 7 automatically determines that appropriate destination candidates where the specified visual target can be seen from a lower position are searched as the search condition. On the other hand, in the case where the type of the specified visual target is a type such as a park that is preferably seen from an upper position, the search condition determining section 7 automatically determines that appropriate destination candidates where the specified visual target can be seen from an upper position are searched as the search condition.

Consequently, the search section 8 can search the appropriate destination candidates where the specified visual target can be seen in a good condition from an upper position or a lower position easily and surely in response to the type of the specified visual target.

Preferably, the information regarding the search condition as to whether the specified visual target should be seen from an upper position or a lower position should be previously registered in the visual target information database 6 in a corresponding relationship with the information of the type of the specified visual target. Then, the search condition determining section 7 automatically determines the search condition as to whether the specified visual target should be seen from an upper position or a lower position based on the information regarding the search condition previously registered in the visual target information database 6. With this method, the search condition determining section 7 can determine the search condition as to whether the specified visual target should be seen from an upper position or a lower position more easily.

In addition to the above-described construction, in this embodiment, the search condition determining section 7 is further designed to receive the information of the type of the specified visual target, which is outputted from the visual target judging section 5, and judge whether the specified visual target is the type of visual target that generally should be seen from a distance or not. In the case where the specified visual target is the type of visual target such as a mountain that generally should be seen from a distance as a result of the judgment, the search condition determining section 7 is designed to automatically determine the search condition that weather is to be taken into consideration and output the automatically determined search condition to the search section 8.

Further, a communication section 11 is connected to the input side of the search section 8, and weather information such as a weather forecast is provided to the communication section 11. Then, the search section 8 is designed to obtain weather information from the communication section 11 based on the search condition that weather, which is automatically determined by the search condition determining section 7, is to be taken into consideration and search appropriate destination candidates that exist in the range of a distance from which the specified visual target can be seen by taking the obtained weather information into consideration. With this method, the search section 8 can search the appropriate destination candidates from which the visual target can be surely seen even in the case of poor visibility due to weather.

In addition to the above-described construction, in this embodiment, the search condition determining section 7 is further designed to automatically determine that the time when the user sees the specified visual target is to be taken into consideration as a search condition in the case where the specified visual target is a moving object such as a train and the evening sun whose position changes with time. Note that the search condition determining section 7 can judge whether or not the specified visual target is a moving object based on the information of the type of specified visual target, which is received from the visual target judging section 5. Further, the time when the user sees the specified visual target may be set by an input operation of the user, the best time (17:00, for example) to see the specified visual target (the evening sun, for example) may be automatically set, or a plurality of times in a predetermined time interval (one hour, for example) may be automatically set. Alternatively, in the case where the specified visual target is a moving object, character information urging the user to input a time to see the specified visual target may be automatically displayed on the display section 3.

Based on the determination of the search condition determining section 7, the search section 8 is designed to search appropriate destination candidates in which the time when the user sees the visual target is taken into consideration. In the case where the specified visual target is a train, the search section 8 obtains the information of the time table and the operation information of the train via the communication section 11, estimates a point where the train would pass at the time when the user is to see the train based on the obtained information, and may search appropriate destination candidates from which he/she can see the estimated point at the time. Further, in the case where the specified visual target is the evening sun, the search section 8 obtains the information of the season and the information of the sunset via the communication section 11, estimates a position to which the evening sun would move at time when the user is to see the evening sun based on the obtained information, and may search appropriate destination candidates from which he/she can see the estimated position at the time.

With this method, in the case where a moving object is the specified visual target, the search section 8 can search appropriate destination candidates in which the time when the user sees the specified visual target is taken into consideration, so that it is possible to search for appropriate destination candidates from which he/she can surely see the moving object. In the case where the time when the user sees the specified visual target is set by a plurality of numbers, the appropriate destination candidates searched by the search section 8 could be different for each time.

In addition to the above-described construction, as a preferable embodiment, the search section 8 preferentially searches appropriate destination candidates from which the specified visual target can be seen to the south. With this method, the search section 8 can preferentially search appropriate destination candidates from which the specified visual target can be seen to the south while considering that many buildings are mainly open to the south side (have windows), so that it is possible to search for appropriate destination candidates from which the specified visual target is more likely to be seen.

The search result of the appropriate destination candidates that are searched by the search section 8 as described above is outputted from the search section 8 to the display section 3. The display section 3 is designed to provide the appropriate destination candidates to the user by displaying the appropriate destination candidates in the user selectable state.

Moreover, in this embodiment, the search section 8 is designed to create a simulation image, in which a landscape viewable on the assumption that the specified visual target is seen from appropriate destination candidates is simulated, by using the map information in the map database 10 based on the search result of the appropriate destination candidates. The search section 8 is designed to be capable of displaying the created simulation image on the display section 3. With this method, the user can set an appropriate destination candidate that he/she likes as a destination out of the appropriate destination candidates based on the simulation image on the display section 3.

In addition to the point search apparatus 4 having the above-described construction, the in-vehicle navigation apparatus 1 is provided with structure for navigation.

Specifically, the user can perform a destination setting input operation (not shown) for selecting a particular appropriate destination candidate from the appropriate destination candidates searched by the search section 8 and setting it as a destination to the input section 2. The input section 2 is designed to output a result of the destination setting input operation to the in-vehicle navigation apparatus 1.

As shown in FIG. 1, a destination setting section 14 is connected to the output side of the input section 2, and the result of the destination setting input operation from the input section 2 is provided to the destination setting section 14. The destination setting section 14 is designed to set a destination based on the result of the destination setting input operation received from the input section 2, and output the set destination (hereinafter, referred to as a set destination).

A route calculating section 15 is connected to the output side of the destination setting section 14, and the information of the set destination from the destination setting section 14 is provided to the route calculating section 15. The map database 10 and a vehicle position calculating section 16 are also connected to the input side of the route calculating section 15.

A GPS receiver 17 and an autonomous navigation sensor 18 such as a gyro sensor are connected to the input side of the vehicle position calculating section 16. The vehicle position calculating section 16, by appropriately using the information regarding track and time received from the GPS receiver 17 and the information regarding the relative position of the vehicle received from the autonomous navigation sensor 18, is designed to calculate a vehicle position being the present position of the vehicle, and output a calculation result to the route calculating section 15.

The route calculating section 15 is designed to perform route calculation of a recommended route from the present vehicle position to a destination based on the set destination received from the destination setting section 14 and the calculation result received from the vehicle position calculating section 16, and output a calculation result. In performing the route calculation, the route calculating section 15 is designed to refer to the map information (road network data, particularly) stored in the map database 10.

A route guiding section 19 is connected to the output side of the route calculating section 15, and the result of route calculation by the route calculating section 15 is provided to the route guiding section 19. Further, the map database 10 is connected to the input side of the route guiding section 19, and the display section 3 and a speaker 20 are connected to the output side of the route guiding section 19. The route guiding section 19 is designed to create a route guiding image for performing route guidance to guide the vehicle to a destination by using the map information of the map database 10 based on the result of the route calculation, and display the route guiding image on the display section 3.

With this method, the route guiding image such as an enlarged intersection image can be displayed on the display section 3, and the vehicle can be guided to the set destination by using the image. Furthermore, the route guiding section 19 is designed to generate guidance voice data based on the result of the route calculation and output the guidance voice data to the speaker 20. This makes it possible to appropriately perform voice guidance such as intersection right/left turn guidance by the speaker 20.

In addition, the in-vehicle navigation apparatus 1 has a map display section 21, and the map display section 21 creates a map image around a vehicle position calculated by the vehicle position calculating section 16 or a map image around a point specified by the input operation of the user by using the map information of the map database 10, and display the created map image on the display section 3.

Next, the basic operation of this embodiment will be described with reference to FIG. 2. In this embodiment, the user, by performing a visual target input operation to the input section 2 first, inputs "park A" shown in FIG. 2 as a visual target that the user wants to see. Further, the user, by performing a search condition input operation to the input section 2, inputs "restaurant" as the condition of destination candidate type as the search condition of destination candidates.

Subsequently, the input section 2 provides a result of the visual target input operation to the visual target judging section 5, and provides a result of the search condition input operation to the search condition determining section 7. Next, the visual target judging section 5, when it receives the result of the visual target input operation from the input section 2, judges that the visual target specified by the user is park A based on the result and the information of the visual target read out from the visual target information database 6. With this, park A is specified as the specified visual target. The visual target judging section 5 outputs the judgment result (park A) of the visual target (specified visual target) to the search section 8.

On the other hand, the search condition determining section 7, when it receives the result (restaurant) of the search condition input operation from the input section 2, determines that restaurants are searched as the destination candidates from which the visual target can be seen, as the search condition based on the result, and outputs the determined search condition to the search section 8. The search section 8, when it receives the judgment result from the visual target judging section 5 and the search condition from the search condition determining section 7, starts searching restaurants from which the user can see park A based on the judgment result and the search condition. In performing the search, the search section 8 performs searching of only points that belong to the type of restaurant from points that exist around park A. Accordingly, as shown in FIG. 2, two restaurants that are the first restaurant on the 52nd floor of building c and the second restaurant on the 47th floor of building d are identified as points (search target points) fulfilling the search condition (restaurants) that exist around park A.

Subsequently, the search section 8 reads out elevation information and plan position information as the information regarding the three dimensional position of park A from the visual target information database 6. The search section 8 also reads out elevation information and plan position information as the information regarding the three dimensional position of the first restaurant and elevation information and plan position information as the information regarding the three dimensional position of the second restaurant from the map database 10.

Next, the search section 8 determines building a as an object that exists between park A and the first restaurant (on virtual line $L_1$ in FIG. 2) based on the plan position information regarding park A, which is read out from the visual target information database 6, and the plan position information regarding the first restaurant, which is read out from the map database 10, and reads out the total height information of building a from the map database 10. Furthermore, the search section 8 determines building b as an object that exists between park A and the second restaurant (on virtual line $L_2$ in FIG. 2) based on the plan position information regarding park A, which is read out from the visual target information database 6, and the plan position information regarding the second restaurant, which is read out from the map database 10, and reads out the total height information of building b from the map database 10.

Then, the search section 8 determines whether the user can see park A out of the first restaurant and the second restaurant based on each information read out from the visual target information database 6 and the map database 10. As shown in FIG. 2, since the elevation of the first restaurant is 200 m whereas the total height of building a, which exists between the first restaurant and park A (elevation: 0 m), is 50 m using the point of elevation 0 m as a reference, building a is not an obstacle to the first restaurant in seeing park A. Therefore, the search section 8 recognizes the first restaurant as a restaurant (appropriate destination candidate) from which park A can be seen.

Figure 2:
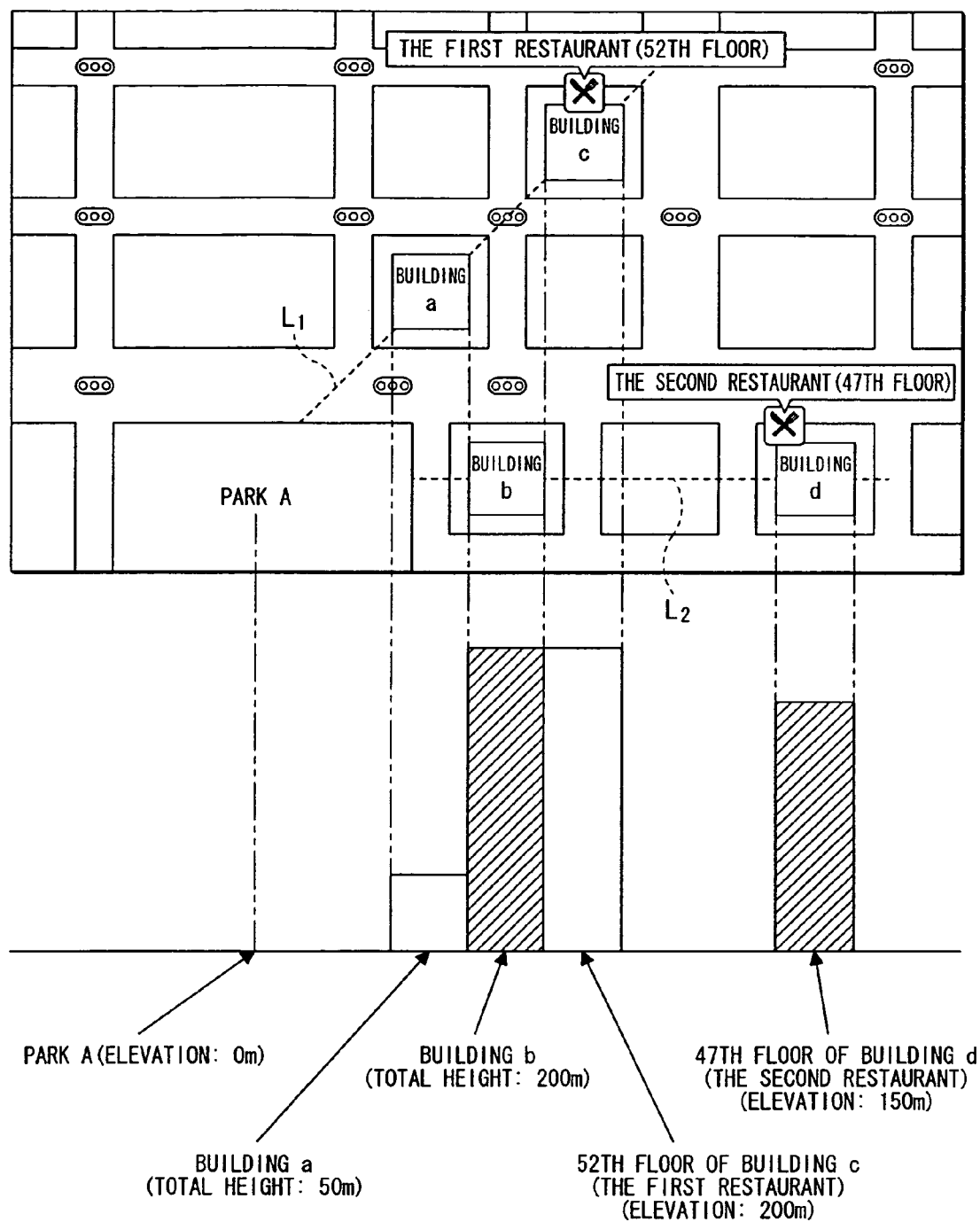
FIG. 2 is an illustration schematically showing a search processing of appropriate destination candidates by a search section in the embodiment of the in-vehicle navigation apparatus according to the present invention.

On the other hand, as shown in FIG. 2, since the elevation of the second restaurant is 150 m whereas the total height of building b, which exists between the second restaurant and park A, is 200 m using the point of elevation 0 m as a reference, building b is an obstacle to the second restaurant in seeing park A. Therefore, the search section 8 removes the second restaurant from the appropriate destination candidates for the reason that it is a restaurant from which park A cannot be seen.

Further, in FIG. 2, in the case where park A and buildings a to d are not on flat land of equal elevation but are built on land having a steep slope, it is preferable to use the elevation information of the highest points of building a and building b instead of the total height information of building a and building b.

Then, the search section 8 can provide the user with the appropriate destination candidates by displaying the search result on the display section 3. Still further, the search section 8, by creating a simulation image recognized when park A is seen from the first restaurant and displaying the image on the display section 3 by using the map information of the map database 10, can allow the user to confirm in advance if the first restaurant suits his/her taste.

As described above, according to the in-vehicle navigation apparatus 1 in this embodiment, it is possible for the search section 8 to search appropriate destination candidates based on the elevation information and the plan position information as the information regarding the three dimensional position of the specified visual target, the elevation information and the plan position information as the information regarding the three dimensional position of the search target point, and the information (the total height information or the elevation information of the highest point) regarding the height of an object that exists between the specified visual target and the search target point. As a result, it is possible to search appropriate destination candidates from which the user can surely see a particular visual target that the user desires, and leads to improved convenience.

Note that the present invention is not limited to the above-described embodiments, but various changes can be made in accordance with particular needs.

For example, in the case where a destination from which a visual target such as a moving object (the evening sun, a train, etc.), which cannot be seen unless the user is at the destination by a predetermined time, can be seen is set, the point search apparatus 4 may provide the user with the departure time from the present position in order to arrive by the predetermined time. Accordingly, by leaving for the destination at the provided departure time or before, the user can surely see the visual target that cannot be seen unless the user is at the destination by the predetermined time.

Further, the appropriate destination candidates may be places (a hill, for example) other than facilities.

According to the point search apparatus and in-vehicle navigation apparatus of the present invention, the search means can search appropriate destination candidates at least based on information regarding the three-dimensional position of the visual target specified by the visual target specifying means, information regarding the three-dimensional position of a point that fulfills the search condition determined by the search condition determining means, which exists around the visual target, and information regarding the height of an object that exists between the visual target and the point. As a result, it is possible to search destination candidates (appropriate destination candidates) from which the user can surely see a particular visual target that the user desires, and thus convenience can be improved.

According to the point search apparatus and in-vehicle navigation apparatus of the present invention, the search means can search appropriate destination candidates fulfilling a search condition regarding types of the destination candidates, which are determined by the search condition determining means. As a result, it is possible to flexibly deal with the desire of the user by searching the types of appropriate destination candidates that the user desires, from which he/she can surely see the visual target, and convenience can be further improved.

According to the point search apparatus and in-vehicle navigation apparatus of the present invention, the search means can search appropriate destination candidates fulfilling a search condition regarding the distance between the visual target and the destination candidate, which is determined by the search condition determining means. As a result, it is possible to flexibly deal with the desire of the user by searching appropriate destination candidates from which the user can surely see the visual target at a distance that the user desires, and convenience can be further improved.

According to the point search apparatus and in-vehicle navigation apparatus of the present invention, the search means can search appropriate destination candidates fulfilling a search condition regarding the sight line angle of the user in a height direction when the user sees the visual target, which is determined by the search condition determining means. As a result, it is possible to flexibly deal with the desire of the user by searching appropriate destination candidates from which the user can see the visual target at an angle that the user desires, and convenience can be further improved.

According to the point search apparatus and in-vehicle navigation apparatus of the present invention, the search means can search appropriate destination candidates fulfilling a search condition regarding a direction in which the user sees the visual target, which is determined by the search condition determining means. As a result, it is possible to flexibly deal with the desire of the user by searching appropriate destination candidates from which the user can see the visual target from a direction that the user desires, and convenience can be further improved.

According to the point search apparatus and in-vehicle navigation apparatus of the present invention, the search means can search appropriate destination candidates fulfilling a search condition regarding the distance between the visual target and the destination candidate, which is automatically determined based on the size of the visual target by the search condition determining means. As a result, it is possible to search destination candidates that exist in positions from which the visual target can be seen with a preferable size without the need of inputting the search condition regarding the distance between the visual target and the destination candidate by the user. Thus, burden of the user can be reduced, and convenience can be further improved.

According to the point search apparatus and in-vehicle navigation apparatus of the present invention, the search means can search appropriate destination candidates from which the user can surely see the visual target while taking weather information into consideration. As a result, appropriate destination candidates from which the user can surely see the visual target can be searched even in the case of poor visibility due to weather, and it is possible to surely respond to the user's desire.

According to the point search apparatus and in-vehicle navigation apparatus of the present invention, the search of destination candidates by the search means can be performed after specifying the desired range of an object as the visual target by the visual target specifying means. As a result, it is possible to flexibly deal with the desire of the user by searching appropriate destination candidates from which the desired range of an object can be seen as the visual target, and convenience can be further improved.

According to the point search apparatus and in-vehicle navigation apparatus of the present invention, the visual target specifying means can provide the user with options for specifying the visual target from an object. As a result, the user can specify the visual target more easily, and convenience can be further improved.

According to the point search apparatus and in-vehicle navigation apparatus of the present invention, the search means can preferentially search appropriate destination candidates from which the visual target can be seen to the south while considering that many buildings are generally open to the south side. As a result, it is possible to surely respond to the user's desire by searching appropriate destination candidates from which the visual target can be seen more surely.

According to the point search apparatus and in-vehicle navigation apparatus of the present invention, the search condition determining means can automatically determine a search condition as to whether the visual target is to be seen from an upper position or a lower position in response to the type of the visual target. As a result, when the type of the visual target is a type of object such as a mountain that is preferably seen from a lower position, for example, it is possible to search appropriate destination candidates from which the visual target can be seen from a lower position easily and surely. On the other hand, when the type of the visual target is a type of object such as a park that is preferably seen from an upper position, it is possible to search appropriate destination candidates where the visual target can be seen from an upper position easily and surely.

According to the point search apparatus and in-vehicle navigation apparatus of the present invention, the search condition determining means can determine a search condition as to whether the visual target is seen from an upper position or a lower position based on information regarding a search condition previously registered in the database. As a result, appropriate destination candidates can be searched quickly and mobility can be improved.

According to the point search apparatus and in-vehicle navigation apparatus of the present invention, the search means can search appropriate destination candidates from which a facility or a landscape can be seen. As a result, it is possible to search appropriate destination candidates from which the user can surely see the facility or the landscape that the user desires, and convenience can be improved.

According to the point search apparatus and in-vehicle navigation apparatus of the present invention, the search means can search appropriate destination candidates from which a moving object can be seen while taking into consideration the time when the moving object as the visual target can be seen. As a result, it is possible to search appropriate destination candidates from which the moving object can surely be seen, and convenience can be further improved.

According to the point search apparatus and in-vehicle navigation apparatus of the present invention, the search means can search appropriate destination candidates from which the evening sun as the moving object can be seen. As a result, it is possible to search appropriate destination candidates that are preferable for seeing the evening sun whose position changes with time.

According to the point search apparatus and in-vehicle navigation apparatus of the present invention, the search means can search appropriate destination candidates from which a train as the moving object can be seen. As a result, it is possible to search appropriate destination candidates that are preferable for seeing the train whose position changes with time.

According to the point search apparatus and in-vehicle navigation apparatus of the present invention, even in the case where the visual target is a moving object that cannot be seen unless the user is at the destination by a predetermined time, it is made possible for the user to arrive by the predetermined time without delay by providing a departure time to allow the user to be in time to see the moving object. As a result, the user can see the moving object more surely.

According to the point search apparatus and in-vehicle navigation apparatus of the present invention, in addition to searching appropriate destination candidates, a simulation image where the visual target is seen from appropriate destination candidates can be displayed on the display section. As a result, it is possible to set an appropriate destination candidate, which the user likes out of the appropriate destination candidates, as a destination based on the simulation image, so that convenience can be further improved.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A point search apparatus provided with a search section, which searches destination candidates by using map information and provides the candidates to a user, said apparatus comprising:

a visual target specifying section for specifying a visual target; and a search condition determining section for determining a search condition regarding destination candidates from which said user has an unobstructed view of said visual target when the user is located at a position specified by the destination candidate, said search condition calculated based on a path defined by three-dimensional coordinates of the visual target and three-dimensional coordinates of the destination candidate , wherein said search section is formed so as to search destination candidates from which said user can have an unobstructed view of the visual target specified by said visual target specifying section, based on at least information regarding the position of said visual target and information regarding the position of a point that fulfills the search condition determined by said search condition determining section.

2. The point search apparatus according to claim 1, wherein the search condition determined by said search condition determining section includes a search condition regarding the type of said destination candidates.

3. The point search apparatus according to claim 1, wherein the search condition determined by said search condition determining section includes a search condition regarding a distance between said visual target and said destination candidate.

4. The point search apparatus according to claim 3, wherein said search condition determining section is formed so as to automatically determine the search condition regarding the distance between said visual target and said destination candidates in response to the size of said visual target.

5. The point search apparatus according to claim 1, wherein the search condition determined by said search condition determining section includes a search condition regarding a sight line angle of said user in a height direction when the user views said visual target.

6. The point search apparatus according to claim 1, wherein the search condition determined by said search condition determining section includes a search condition regarding a direction in which the user sees said visual target.

7. The point search apparatus according to claim 1, wherein
in the case where said visual target specified by said visual target specifying section is a type of visual target that is generally to be seen from a distance,
said search condition determining section automatically determines a search condition where weather is taken into consideration, and said search section is formed so as to obtain weather information based on the determination to search said destination candidates that exist within the range of distance at which said visual target can be seen, by taking the obtained weather information into consideration.

8. The point search apparatus according to claim 1, wherein
said visual target specifying section is formed to be capable of specifying a desired range of an object as said visual target.

9. The point search apparatus according to claim 8, wherein
said visual target specifying section is formed so as to provide a plurality of user selectable range options, which are organized into a plurality of steps to allow the area of said range to be different for each step, as options of range that can be specified as a visual target on said object.

10. The point search apparatus according to claim 1, wherein
said search section is formed so as to preferentially search said destination candidates from which said visual target can be seen to the south.

11. The point search apparatus according to claim 1, wherein
said search condition determining section is formed so as to automatically determine a search condition as to whether said visual target is seen from an upper position or a lower position in response to the type of said visual target.

12. The point search apparatus according to claim 11, wherein
information regarding the search condition as to whether said visual target is seen from an upper position or a lower position is previously registered in a database in a corresponding relationship with information regarding the type of said visual target, and
said search condition determining section is formed so as to determine the search condition as to whether said visual target is seen from an upper position or a lower position based on the previously registered information.

13. The point search apparatus according to claim 1, wherein
said visual target includes at least one of a facility and a landscape.

14. The point search apparatus according to claim 1, wherein
in the case where said visual target is a moving object whose position changes depending on time,
said search condition determining section automatically determines that the time when said visual target is to be seen is taken into consideration as the search condition, and said search section is formed so as to search said destination candidates taking into consideration the time when said visual target is to be seen based on the determination.

15. The point search apparatus according to claim 14, wherein
said moving object is the evening sun.

16. The point search apparatus according to claim 14, wherein
said moving object is a train.

17. The point search apparatus according to claim 14, wherein
the apparatus is formed to be capable of providing a departure time in order to allow the user to arrive at a destination in time to see said visual target.

18. The point search apparatus according to claim 1, wherein
the apparatus is formed to be capable of displaying an image, which simulates an image seen on the assumption that said visual target is viewed from said destination candidate searched by said search section, on a display section.

19. An in-vehicle navigation apparatus provided with a search section, which searches destination candidates by using map information and provides the candidates to a user, said apparatus comprising:
a visual target specifying section for specifying a visual target; and
a search condition determining section for determining a search condition regarding destination candidates from which said user can see said visual target without obstruction when the user is at the location of the destination candidate, said search condition calculated based on a path defined by three-dimensional coordinates of the visual target and three-dimensional coordinates of the destination candidate, wherein
said search section is formed so as to search destination candidates from which said user can have an unobstructed view of the visual target specified by said visual target specifying section when the user is at the location of the destination candidate, the search at least based on information regarding the three-dimensional position of said visual target, information regarding the three-dimensional position of a point that fulfills the search condition determined by said search condition determining section, and information regarding the height of an object that exists between said visual target and said point.

20. The in-vehicle navigation apparatus according to claim 19, wherein
the search condition determined by said search condition determining section includes a search condition regarding the type of said destination candidates.

21. The in-vehicle navigation apparatus according to claim 19, wherein
the search condition determined by said search condition determining section includes a search condition regarding a distance between said visual target and said destination candidate.

22. The in-vehicle navigation apparatus according to claim 21, wherein
said search condition determining section is formed so as to automatically determine the search condition regarding a distance between said visual target and said destination candidate in response to the size of said visual target.

23. The in-vehicle navigation apparatus according to claim 19, wherein
the search condition determined by said search condition determining section includes a search condition regarding a sight line angle of said user in a height direction when the user views said visual target.

24. The in-vehicle navigation apparatus according to claim 19, wherein
the search condition determined by said search condition determining section includes a search condition regarding a direction in which the user sees said visual target.

25. The in-vehicle navigation apparatus according to claim 19, wherein
in the case where said visual target specified by said visual target specifying section is a type of visual target that is generally to be seen from a distance,
said search condition determining section automatically determines a search condition where weather is taken into consideration, and said search section is formed so as to obtain weather information based on the determination to search destination candidates that exist within the range of distance at which said visual target can be seen, by taking the obtained weather information into consideration.

26. The in-vehicle navigation apparatus according to claim 19, wherein
said visual target specifying section is formed to be capable of specifying a desired range of an object as said visual target.

27. The in-vehicle navigation apparatus according to claim 26, wherein
said visual target specifying section is formed so as to provide a plurality of user selectable range options, which are organized into a plurality of steps to allow the area of said range to be different for each step, as options of range that can be specified as a visual target on said object.

28. The in-vehicle navigation apparatus according to claim 19, wherein
said search section is formed so as to preferentially search said destination candidates from which said visual target can be seen to the south.

29. The in-vehicle navigation apparatus according to claim 19, wherein
said search condition determining section is formed so as to automatically determine a search condition as to whether said visual target is seen from an upper position or a lower position in response to the type of said visual target.

30. The in-vehicle navigation apparatus according to claim 29, wherein
information regarding the search condition as to whether said visual target is seen from an upper position or a lower position is previously registered in a database in a corresponding relationship with information regarding the type of said visual target, and
said search condition determining section is formed so as to determine the search condition as to whether said visual target is seen from an upper position or a lower position based on the previously registered information.

31. The in-vehicle navigation apparatus according to claim 19, wherein
said visual target includes at least one of a facility and a landscape.

32. The in-vehicle navigation apparatus according to claim 19, wherein
in the case where said visual target is a moving object whose position changes depending on time,
said search condition determining section automatically determines that the time when said visual target is seen is taken into consideration as the search condition, and said search section is formed so as to search said destination candidates taking into consideration the time when said visual target is to be seen based on the determination.

33. The in-vehicle navigation apparatus according to claim 32, wherein
said moving object is the evening sun.

34. The in-vehicle navigation apparatus according to claim 32, wherein
said moving object is a train.

35. The in-vehicle navigation apparatus according to claim 32, wherein
the apparatus is formed to be capable of providing a departure time in order to allow the user to arrive at a destination in time to see said visual target.

36. The in-vehicle navigation apparatus according to claim 19, wherein
the apparatus is formed to be capable of displaying an image, which simulates an image seen on the assumption that said visual target is viewed from said destination candidate searched by said search section, on a display section.

* * * * *